Patented Sept. 19, 1922.

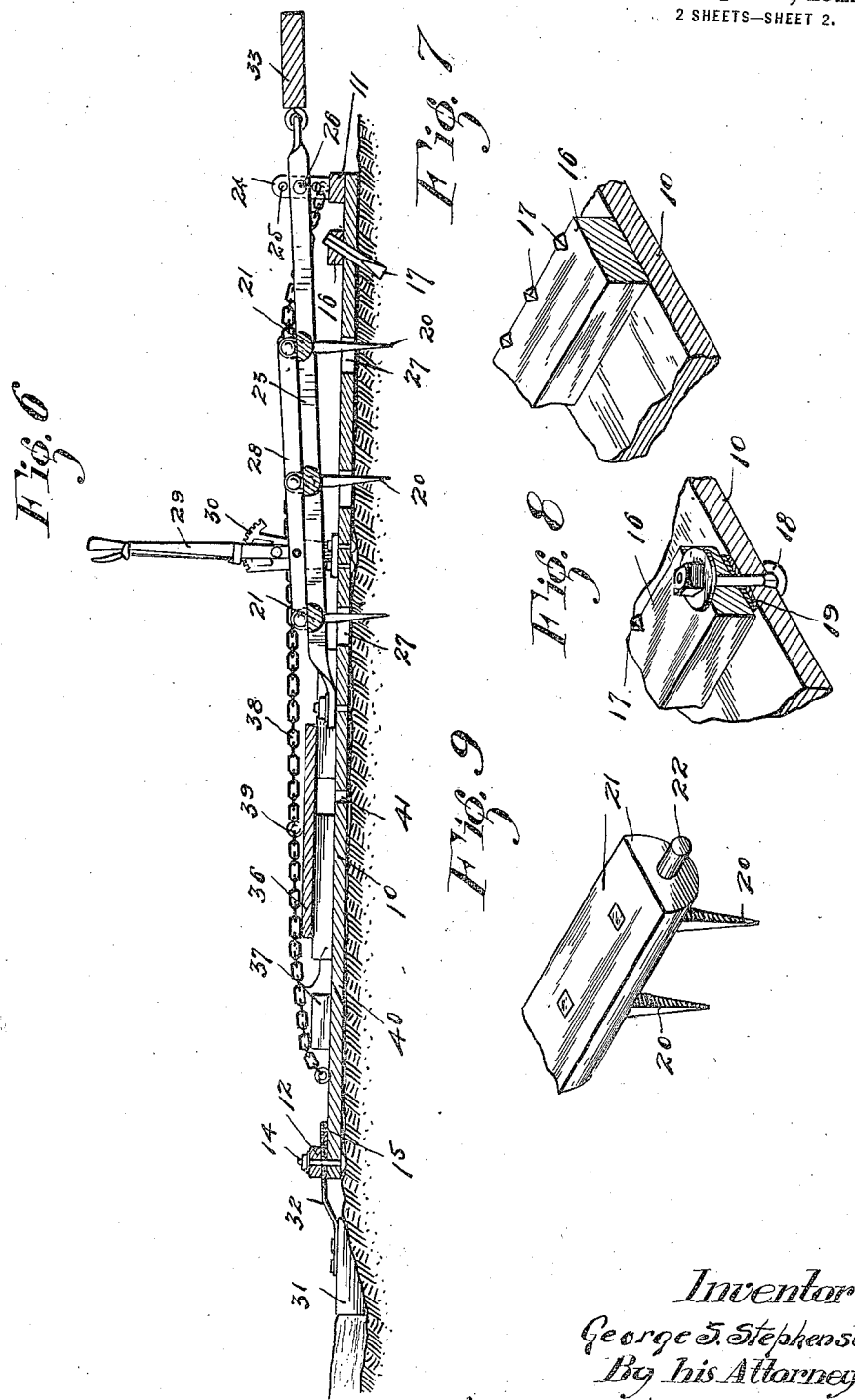

1,429,376

UNITED STATES PATENT OFFICE.

GEORGE S. STEPHENSON, OF LOS ANGELES, CALIFORNIA.

FARM IMPLEMENT.

Application filed October 27, 1921. Serial No. 510,816.

*To all whom it may concern:*

Be it known that I, GEORGE S. STEPHENSON, a citizen of the United States, residing at Los Angeles, in the county of Los Angeles and State of California, have invented certain new and useful Improvements in Farm Implements; and I do hereby declare the following to be a full, clear, and exact description of the invention, such as will enable others skilled in the art to which it appertains to make and use the same.

My invention relates to farm implements especially adapted for use in preparing seed beds and for after-cultivation, either before or after the seed is up.

In the preferred form of the implement, the same, in passing over a field, first scores, checks or breaks up the crusted surface thereof. The surface is next pulverized and worked to the desired depth and all clods crushed and the surface thereof leveled or smoothed. In this smoothed surface of the soil, there is finally formed closely positioned corrugations produced by so-called "corrugating mulchers," which are pressed into the soil without packing and dragged therethrough, leaving the soil in a mulched condition to conserve the moisture, prevent packing and to prevent the soil from blowing away, drifting or washing during heavy rain storms.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the invention;

Fig. 2 is a fragmentary perspective view showing the front right-hand side of the invention on an enlarged scale, with some parts removed;

Fig. 3 is a detail view in side elevation with some parts sectioned on the line 3—3 of Fig. 1 on an enlarged scale;

Fig. 4 is a perspective view of the parts shown in Fig. 3 with the corrugating mulcher indicated in different positions by means of broken lines and also showing its attaching arm vertically adjusted into another position;

Fig. 5 is a transverse section taken on the line 5—5 of Fig. 1 and showing the corrugating mulchers pressed into the ground;

Fig. 6 is a longitudinal section taken on the line 6—6 of Fig. 1 on an enlarged scale;

Fig. 7 is a fragmentary perspective view in section taken on the line 7—7 of Fig. 2.

Fig. 8 is a fragmentary perspective view in section taken on the line 8—8 of Fig. 2; and Fig. 9 is a fragmentary perspective view of one of the harrow-tooth-equipped rock bars removed from the supporting arms.

The numeral 10 indicates a deck having a smooth under surface and, as shown, is made up of a plurality of forwardly and rearwardly extended boards held in position by front and rear transverse tie-bars 11 and 12, respectively. These tie-bars 11 and 12 are placed on top of the deck 10 and the latter thereof is detachably secured thereto by end bolts 13 and intermediate bolts 14, which afford pivots, as will presently appear. Secured to the top of the deck 10, just in front of the tie-bar 12, is a wearing iron 15.

Detachably and adjustably secured to the top of the deck 10, just back of the front tie-bar 11, is a transverse bar 16, in which is permanently secured a transverse row of rearwardly inclined teeth 17 of the so-called "saber" type, for scoring, checking or breaking up the crusted surface of the soil and which teeth extend through apertures in the deck 10. This bar 16 is detachably secured to the deck 10 by bolts 18 and to vary the operative length of the teeth 17, shims 19, in the form of washers, are placed on said bolts between the bar 16 and deck 10. Back of the teeth 17 are, as shown, three rows of harrow teeth 20 and the teeth of each row are made progressively shorter from the front to the rear of the deck 10. Each row of harrow teeth 20 is rigidly secured to a transverse rock bar 21 having at its ends trunnions 22 journaled in a pair of horizontally disposed arms 23. The rear ends of the arms 23 are secured to the top of the deck 10 with sufficient flexibility to permit the front ends thereof to be vertically adjusted and thereby vary the operative length of the harrow teeth 10. To vertically adjust the front ends of the arms 23 and hold the same in different predetermined positions, there is secured to each end of the tie-bar 11 an upstanding bracket 24 having a plurality of vertically spaced holes 25, through any one of which and a hole in the respective arm 24 is adapted to be inserted a bolt 26. The harrow teeth 20 work loosely through slots 27 in the deck 10. To hold the rock bars 21 with the harrow teeth 20 in different set positions and for simultaneously rocking said bars to set said harrow teeth at right angles to the deck or in different rearwardly inclined positions in respect thereto, said rock bars are flexibly connected by a bar 28 which, in turn, is held in different endwise adjustments by a latch lever 29 and co-operating lock segment 30 secured to the deck 10.

Following the deck 10 is a transverse row of corrugating mulchers 31, to the tops of which are rigidly secured forwardly extending spring arms 32 pivoted to the bolts 14. These corrugating mulchers 31 are V-shaped in cross section and their sharp lower edges are tapered from the rear ends thereof to sharp points in the plane of the tops thereof. In Fig. 3, the arms 32 are shown as extended between the bar 12 and deck 10 and rest on the wearing iron 15, and in Fig. 4 these arms are vertically adjusted by placing the same directly on top of the bar 12. The arms 32 are securely held either under or on top of the bar 12 against vertical movement and against vertical angular movement in respect to the deck but with freedom for lateral oscillatory movement, as indicated by broken lines in Fig. 4.

Two or more decks 10 may be placed side by side and, in the drawings, two of said decks are thus shown and their outside arms 23 are extended and have attached thereto a draft bar 33 provided with a pair of converging links 34 connected by a ring 35 for attaching the implement either to draft animals or a tractor. To hold the implement to its work, there is provided a transverse foot board 36, which rests on two cleats 37 secured to the top of the deck 10. Extending longitudinally over the cleats 37 and transversely over the foot board 36 are two chains 38 anchored at their ends to the tops of the decks 10 and to which foot board are secured hooks 39 adapted to be interlocked with the links of said chains to hold the foot board 36 in different positions on the decks 10. In case the operator does not wish to ride on the foot board 36, a box or other receptacle containing weights, such as stones, may be placed on the decks and shifted either forward or backward to distribute the weight as desired.

The rearwardly inclined teeth 17, in passing over the crusted surface of the soil, simply score, check or break the same in advance of the harrow teeth, which pulverize the broken up surface of the soil and work the same to the desired depth. The depth to which the soil may be worked by the harrow teeth may be varied, at will, by vertically adjusting the front ends of the arms 23. The smooth under surface of the decks 10 crush all clods of earth and level the surface of the soil, which is then corrugated by the corrugating mulcher 31 and left in a mulched condition. These corrugating mulchers are yieldingly held in the soil by the spring arms 32 and in case they strike a stone, stump or other obstruction, will be pivotally moved thereby, laterally, to clear the obstruction and then returned to normal position under the advance movement of the implement.

By removing the bar 16 and placing the same on the deck 10, rearward of the harrow teeth 20, with its teeth 17 extending through the apertures 40 and, by mounting on the deck 10 a bar with harrow teeth extending through apertures 41 and removing the corrugating mulchers 31, the implement may be converted into a weed gatherer of the type disclosed in my U. S. Patent #1,364,900, issued January 11, 1921. By removing the teeth 17, harrow teeth 20 and corrugating mulchers 31 from the decks, the implement may be used as a leveler.

What I claim is :—

1. An implement of the kind described having a transverse row of corrugating mulchers, said mulchers being V-shaped in cross section with their upper edges flaring rearward at less than 45 degrees.

2. An implement of the kind described having a transverse row of corrugating mulchers free for lateral oscillatory movement, said mulchers being V-shaped in cross section with their upper edges flaring rearward at less than 45 degrees.

3. An implement of the kind described having a transverse row of yieldingly pressed corrugating mulchers, said mulchers being V-shaped in cross section with their upper edges flaring rearward at less than 45 degrees.

4. An implement of the kind described having a transverse row of individually yieldingly pressed corrugating mulchers, said mulchers being V-shaped in cross section with their upper edges flaring rearward at less than 45 degrees.

5. An implement of the kind described having a transverse row of corrugating mulchers, said mulchers being V-shaped in cross section and forwardly tapered at their lower edges, the upper edges of the mulchers being flared rearward at less than 45 degrees.

6. An implement of the kind described having a leveler, and a transverse row of corrugating mulchers provided with forwardly extended arms attached to the leveler, said mulchers being V-shaped in cross section with their upper edges flaring rearward at less than 45 degrees.

7. An implement of the kind described having a leveler, and a transverse row of corrugating mulchers provided with forwardly extended spring arms attached to the leveler, said mulchers being V-shaped in cross section with their upper edges flaring rearward at less than 45 degrees.

8. An implement of the kind described having a leveler, and a transverse row of corrugating mulchers provided with forwardly extended arms pivoted to the leveler for lateral oscillatory movement, said mulchers being V-shaped in cross section with their upper edges flaring rearward at less than 45 degrees.

9. An implement of the kind described having a leveler, and a transverse row of corrugating mulchers provided with forwardly extended arms pivoted to the leveler for lateral oscillatory movement and vertical adjustment, said mulchers being V-shaped in cross section with their upper edges flaring rearward at less than 45 degrees.

10. An implement of the kind described having a leveler, a bar on top of the leveler and a multiplicity of bolts securing the bar to the leveler, and a transverse row of corrugating mulchers provided with forwardly extended arms pivoted to said bolts with freedom for lateral oscillatory movement, said arms being held by the bar in different vertical adjustment on the bolts.

11. An implement of the kind described having a leveler, a bar on top of the leveler and a multiplicity of bolts securing the bar to the leveler, a transverse row of corrugating mulchers provided with forwardly extended arms pivoted to said bolts, with freedom for lateral oscillatory movement, said arms being held by the bar in different vertical adjustment on the bolts, and a wearing iron on the leveler for said arms.

12. An implement of the kind described including a leveler, and a transverse row of corrugating mulchers following the leveler, said mulchers being V-shaped in cross section with their upper edges flaring rearward at less than 45 degrees.

13. An implement of the kind described having a transverse row of rearwardly inclined scoring teeth, and a leveler having a smooth under surface following the scoring teeth.

14. An implement of the kind described having a transverse row of rearwardly inclined scoring teeth, a leveler following the scoring teeth, and a transverse row of corrugating mulchers following the leveler, said mulchers being V-shaped in cross section with their upper edges flaring rearward at less than 45 degrees.

15. An implement of the kind described having a transverse row of rearwardly inclined scoring teeth and harrow teeth following the scoring teeth, said scoring teeth being V-shaped in transverse section.

16. An implement of the kind described having a transverse row of rearwardly inclined scoring teeth, harrow teeth following the scoring teeth, said leveler having a smooth under surface through which said scoring and harrow teeth project, and a leveler following the harrow teeth.

17. An implement of the kind described having a transverse row of rearwardly inclined scoring teeth, harrow teeth following the scoring teeth, a leveler following the harrow teeth, and a transverse row of corrugating mulchers following the leveler.

18. An implement of the kind described having a transverse row of rearwardly inclined scoring teeth, harrow teeth following the scoring teeth, and a leveler following the harrow teeth and provided with forwardly extended spring arms secured to the leveler with freedom for lateral oscillatory movement.

19. An implement of the kind described comprising a frame having a smooth under surface, a pair of horizontally disposed arms attached at one of their ends to the frame, means for vertically adjusting the other ends of the arms, and a plurality of harrow teeth carried by said arms and working through aperatures in said frame.

20. An implement of the kind described comprising a frame, a pair of horizontally disposed arms extending above the frame and, attached at their rear ends thereto, means for vertically adjusting the front ends of the arms, a plurality of harrow teeth carried by said arms, and a draft device attached directly to said arms.

21. An implement of the kind described comprising a frame, a pair of horizontally disposed arms attached at one of their ends to the frame, means for vertically adjusting the other ends of the arms, a plurality of harrow tooth-equipped transverse bars secured to said arms and working through apertures in the frame, and means for rocking said bars and holding the same in different set positions.

22. An implement of the kind described comprising a frame, a pair of horizontally disposed arms attached at one of their ends to the frame, means for vertically adjusting the other ends of the arms, a plurality of harrow tooth-equipped transverse rock bars secured to said arms and working through apertures in the frame, and means for rocking said bars and holding the same in different positions.

23. An implement of the kind described comprising a frame, a pair of horizontally disposed arms attached at one of their ends to the frame, means for vertically adjusting the other ends of the arms, a plurality of harrow tooth-equipped transverse rock bars secured to said arms, means for rocking said bars on the arms and holding the same in different set positions, and rearwardly inclined scoring teeth secured to the frame forward of the harrow teeth.

24. An implement of the kind described comprising a frame, a pair of horizontally disposed arms attached at one of their ends to the frame, means for vertically adjusting the other ends of the arms, a plurality of harrow tooth-equipped transverse rock bars secured to said arms, means for rocking said bars on the arms and holding the same in different positions, and rearwardly inclined scoring teeth bodily adjustable longitudinally on the frame in respect to the harrow teeth.

25. An implement of the kind described comprising a deck having a smooth under surface, and a bar rigidly secured to the top of the deck and equipped with rearwardly inclined scoring teeth which extend through apertures in the deck.

26. An implement of the kind described comprising a deck having a smooth under surface, and a bar detachably secured to the top of the deck and equipped with rearwardly inclined scoring teeth which extend through the apertures in the deck.

27. An implement of the kind described comprising a deck having a smooth under surface, a bar rigidly secured to the top of the deck and equipped with rearwardly inclined scoring teeth which extend through apertures in the deck, and harrow teeth secured to the deck rearward of the scoring teeth.

28. An implement of the kind described comprising a deck having a smooth under surface, a bar secured to the top of the deck and equipped with rearwardly inclined scoring teeth which extend through apertures in the deck, and harrow teeth equipped bars secured to the top of the deck rearward of the scoring teeth with its teeth extending through apertures in the deck.

29. An implement of the kind described comprising a deck having a smooth under surface, a bar secured to the top of the deck and equipped with rearwardly inclined scoring teeth which extend through apertures in the deck, harrow teeth equipped bars secured to the top of the deck rearward of the scoring teeth with their teeth extending through apertures in the deck, and means for moving the harrow teeth equipped bars to adjust their teeth both angularly and endwise in respect to the deck.

30. An implement of the kind described comprising a deck having a smooth under surface, a transverse row of rearwardly inclined scoring teeth, harrow teeth carried by the deck rearward of the scoring teeth, corrugating mulchers attached to the deck rearward thereof, and a weight-supporting device shiftable on the deck either forward or rearward.

In testimony whereof I affix my signature.

GEORGE S. STEPHENSON